(12) United States Patent
Borlez et al.

(10) Patent No.: US 8,886,134 B2
(45) Date of Patent: Nov. 11, 2014

(54) MONITORING SYSTEM FOR A DOPPLER TRANSCEIVER

(75) Inventors: Yves Borlez, Heure-le-Romain (BE); Soufien Menai, Liege (BE)

(73) Assignee: BEA SA, Angleur (BE)

( * ) Notice: Subject to any disclaimer, the term of this patent is extended or adjusted under 35 U.S.C. 154(b) by 43 days.

(21) Appl. No.: 13/191,382

(22) Filed: Jul. 26, 2011

(65) Prior Publication Data

US 2012/0021698 A1 Jan. 26, 2012

(30) Foreign Application Priority Data

Jul. 26, 2010 (EP) .................................... 10170828

(51) Int. Cl.
| | | |
|---|---|---|
| *H04B 1/38* | (2006.01) | |
| *G01S 13/75* | (2006.01) | |
| *G01S 13/50* | (2006.01) | |
| *G01S 7/40* | (2006.01) | |
| *G01S 7/03* | (2006.01) | |

(52) U.S. Cl.
CPC ............. *G01S 7/4052* (2013.01); *G01S 13/753* (2013.01); *G01S 13/50* (2013.01); *G01S 7/4017* (2013.01); *G01S 2007/4078* (2013.01); *G01S 13/758* (2013.01); *G01S 7/036* (2013.01); *G01S 13/756* (2013.01)
USPC ......... 455/73; 455/67.11; 455/69; 340/539.1; 340/554

(58) Field of Classification Search
USPC ......... 455/12.1, 67.11, 69, 73, 86; 340/539.1, 340/554
See application file for complete search history.

(56) References Cited

U.S. PATENT DOCUMENTS

| | | | |
|---|---|---|---|
| 3,947,834 A | | 3/1976 | Gershberg |
| 5,841,393 A | * | 11/1998 | Saito et al. .................... 342/165 |
| 6,633,254 B1 | * | 10/2003 | Sutphin ............................ 342/28 |
| 7,023,377 B2 | * | 4/2006 | Axelsson ....................... 342/109 |
| 7,057,550 B1 | * | 6/2006 | Aker ............................. 342/109 |

FOREIGN PATENT DOCUMENTS

| | | |
|---|---|---|
| DE | 2256926 | 5/1974 |
| DE | 2256926 A1 | 5/1974 |
| DE | 102005046044 A1 | 3/2007 |
| EP | 0411234 B1 | 1/1995 |
| EP | 0825455 A2 | 2/1998 |
| EP | 0916929 A1 | 5/1999 |

OTHER PUBLICATIONS

European Search Report, European Patent Office, European Serial No. 10170828.7-2200, Jul. 15, 2011, Applicant Bea SA, Inventors Borlez and Menai.
European Patent Office, Extended European Search Report, Application No. 10170828.7-2220, Jul. 15, 2011, Munich, Germany, pp. 1-17.
European Patent Office, Office Action, May 15, 2013, pp. 1-4, Munich Germany, Application No. 101708287-1812, Applicant: Bea S.A.

* cited by examiner

*Primary Examiner* — Tuan H Nguyen
(74) *Attorney, Agent, or Firm* — Woodling, Krost and Rust

(57) ABSTRACT

The invention relates to a method for monitoring the integrity of a Doppler transceiver, where a Doppler transceiver comprises a transmitter unit, a receiver unit and a mixer unit, where a signal is transmitted from the transmitter characterized in that the transmitted signal is at least partially coupled into a modulation unit, where the coupled signal is modulated according to certain parameters, and the modulated signal is transmitted to the receiver unit. The invention also relates to a Doppler transceiver comprising a transmitter unit and a receiver unit having at least one antenna (34, 54, 66, 74, 90, 96) and a mixer unit (38, 64), characterized in that it also comprises a modulation unit (48, 70, 86, 106) which is electrically disconnected to the antenna (34, 54, 66, 74, 90, 96).

19 Claims, 3 Drawing Sheets

MONITORING SYSTEM FOR A DOPPLER TRANSCEIVER

Figure 1:
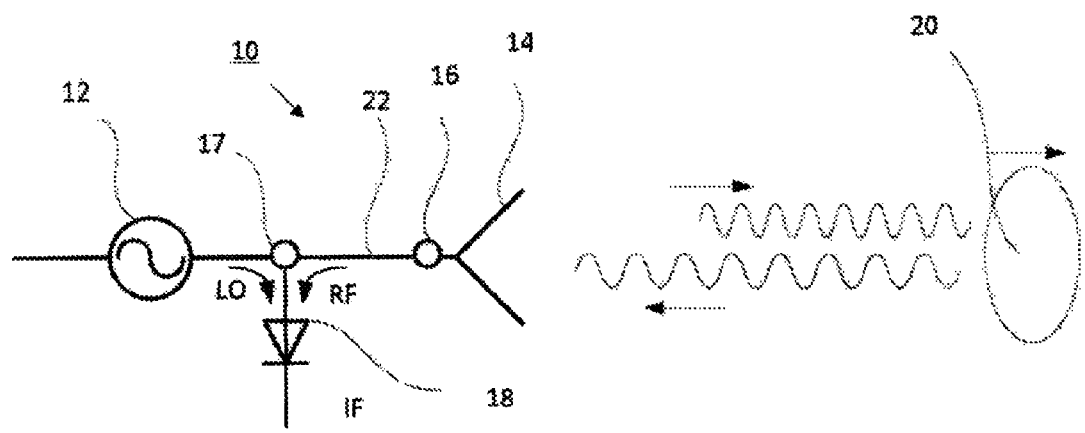

This patent application claims priority of and the benefit of European patent application number: 10 170 828.7 filed on Jul. 26, 2010. European patent application number 10 170 828.7, filed on Jul. 26, 2010, is incorporated herein in its entirety by reference hereto.

The present invention relates to a method for monitoring the integrity of a Doppler transceiver.

Doppler sensors are well known as motion detectors. An oscillator generates a signal, usually an electromagnetic wave, having a certain frequency which is transmitted from an antenna in order to detect the movement of an object. A frequency shifted wave is reflected by the object and received by an antenna. The frequency of the signal varies according to speed and direction of the detected object in relation to the transceiver. In order to determine the difference frequency, the outgoing and the incoming signals are mixed in a mixer unit. The difference frequency or Doppler frequency may be processed in a processing unit, and, for example, controls an automatic door. It is desirable that, in the case of automatic doors, the doors can be positioned in a safe state (open), if the motion sensor is not working properly in order to avoid people being trapped inside a building for example, in case of fire. Therefore, monitoring of the integrity of the motion sensors is necessary. By extension same Doppler sensors may also be used for presence and/or distance sensing. In this case the frequency of the transmitted signal is modulated. As a consequence the time required by the wave to go from the transmitter to the target and from the target to the receiver will induce a frequency shift between the transmitted wave and the wave reflected by the object even if the object is not moving. The frequency shift varies according to the distance between the Doppler sensors and the target. In order to determine the difference frequency, the outgoing and the incoming signals are mixed in a mixer unit. The difference frequency may be processed in a processing unit to define the presence and the distance of the fixed target. For same reasons as Doppler motion sensors monitoring of the integrity of such a presence and/or distance sensors is also necessary.

In order to monitor the integrity of a microwave Doppler transceiver, a method is known to modulate the amplitude and/or the frequency of the transmitted signal by modulating the power supply of the oscillator. The transmitted signal is also fed through the mixer unit to mix it with the received signal in order to obtain the Doppler frequency. (See for example EP 0411 234 B1)

This method, however, is not capable of detecting failures of the antennae, since most of the modulation is fed through the mixer unit directly. Furthermore, this approach relies heavily on oscillation modulation capability of the oscillator and the coupling factor between the mixer and the oscillator. These parameters are difficult to control, especially with low costs units designed for mass production.

It is the object of the invention to achieve a monitoring of the integrity of a microwave Doppler transceiver avoiding the drawbacks of the state of the art.

It is known in the state of the art to use a method for monitoring the integrity of a Doppler transceiver, where the Doppler transceiver comprises an oscillator, a transmitter unit, a receiver unit and a mixer unit. The output of the mixer unit is connected to a processing unit. The transmitted signal is modulated to monitor the integrity of the transceiver.

According to the invention, the method for monitoring a transceiver is characterized in that the monitoring is done by providing a stimulation of the transceiver through a microwave coupling of a modulating device to the transceiver. Hence, according to the invention, the signal is transmitted from the transmitter unit, it is then coupled to a modulation unit, which modulates the signal according to defined modulation parameters. Afterwards, the modulated signal is coupled back to the receiver unit. In the further process the received modulated signal, where a certain modulation level is adjusted, is mixed with the transmitted signal in the mixer. The detected modulation is measured by the processing unit and compared to an expected value. If the detected modulation level is different than the one expected, it can be assumed that there is a failure in the transceiver system. Dependent on the deviation of the modulation, a failure can easily be determined. The modulation circuit is triggered either permanently or periodically to check the integrity of the transceiver. The transceiver's integrity is verified in regular time intervals. This way, the performance of the whole transceiver including the radiating antennae can be maintained.

In case of a single antenna transceiver the transmitted signal can be coupled via a coupling unit to the modulator unit and then be modulated with certain parameters. The modulated signal is reflected back to the antenna and received by the transceiver in that way. The received signal is mixed with the transmitted signal. This way the demodulated IF signal is obtained. The IF signal is compared to the expected level. This comparison allows detecting a failure of the transceiver.

Alternatively, a similar method within the scope of the invention can be used for monitoring the integrity of a transceiver comprising at least two antennae where the first antenna is a transmitting antenna and the second antenna is a receiving antenna. A non modulated signal is transmitted by the transmitting antenna. It is then coupled to a coupling unit and the signal is led to a modulation unit where certain defined parameters are modulated on the signal. The parameters can be implemented on the modulation unit in an unchangeable way or may be influenced by a processing unit. Anyhow, the modulated signal is then led to a coupling unit, and coupled back to the receiving antenna. It is then transferred to a mixer unit where it is mixed with the transmitted signal to obtain the demodulated IF signal. The comparison of the obtained IF Signal parameters and the expected parameters allows detecting a failure of the transceiver. In an advantageous way, the modulator parameters can relate to amplitude, frequency, or phases. Also combinations of these parameters are within the scope of this invention.

The coupling of the modulation unit to the antenna, as described in the foregoing method can be done either wired or wireless. The important point is that the signal, in difference to the state of the art, is coupled from and to the antenna, which allows that the sensors integrity check includes the check of the antenna. Using a wireless type of coupling, the radiation characteristics of the antenna might be monitored additionally. A wireless coupling induces a coupling at RF frequencies while a wired coupling may also allow coupling at low frequencies.

A further aspect of the invention is a device to accomplish the method. The device for monitoring the integrity of a Doppler transceiver comprises a Doppler transceiver as well as at least one coupling unit and a modulation unit. The transceiver comprises a processing unit which determines the deviation of the received IF signal compared to the expected received IF signal when modulation is applied. An advantageous aspect of the invention is that there can be a total low frequency electrical decoupling between the modulation circuit and the transceiver in case of wireless coupling. This is particularly desirable for ensuring a proper testing of the device without any direct galvanic flow of current through any part of the device under test.

In a first preferred embodiment the reflection modulator may be composed of a semiconductor the impedance of which varies according to a modulation signal having a frequency within the IF bandwidth of the transceiver. The modulation unit may especially comprise a single microwave PIN or Schottky diode, or a transistor having the above mentioned feature. According to the modulation, the reflection coefficient of the modulator will then vary and a signal that is different in phase and amplitude will be sent back to the antenna. According to the invention this applied signal will cause a detected IF signal at the IF output of the mixer. This output signal can be processed by the processing unit and classified as a correct response of the transceiver under the applied calibrated stimulation.

In a second preferred embodiment the transmitter unit and the receiver unit can be built with at least a single antenna used for transmit and receive. Several antenna configurations can be used to modify the radiation pattern of the radar, but are each used for both namely transmitting and receiving. In this embodiment the coupling unit is connected to a modulation unit where the modulation unit comprises a reflection type of modulator providing different reflection coefficients according to the modulation. The reflection modulator reflects the modulated signal to the antenna, where it is fed to the receiver unit.

In a further embodiment the transceiver comprises at least one transmitter antenna and at least one receiver antenna. In this case, there are two separate coupling structures.

Like known it is the state of the art, a coupling unit interconnecting the feed lines of the antennas, does not allow a check if the antennae are working or not.

According to the invention, the coupling structure is advantageously arranged in the vicinity of the antennae, including these in the whole monitoring chain. Due to the high sensitivity of the Radar transceivers and the proximity of the coupling structure to the antenna, there is only a light coupling necessary. Therefore, the coupling will have a negligible effect on the antenna's radiation characteristics. The light coupling is still sufficient to ensure proper operation of the monitoring circuit.

Alternatively the coupling can be done in a wired way, where the modulation unit is galvanically coupled to the antennas.

If the inclusion of the antennas into the monitoring chain is not mandatory, a fairly good amount of monitoring can be ensured by providing a modulation directly on (or between) the transmission line(s) connecting to the antennas.

In a very advantageous embodiment the coupling unit and the modulation unit can be arranged on the same platform as the antennae of the transceiver. This allows a compact transceiver arrangement including an integrity-check circuit.

Such a monitoring method can be advantageously used to monitor radar motion sensors mounted on automatic or manual doors or gates, preferably installed on escape routes.

Further advantages, features and potential applications of the present invention may be gathered from the description which follows in conjunction with the embodiments illustrated in the drawings.

Figure 2:
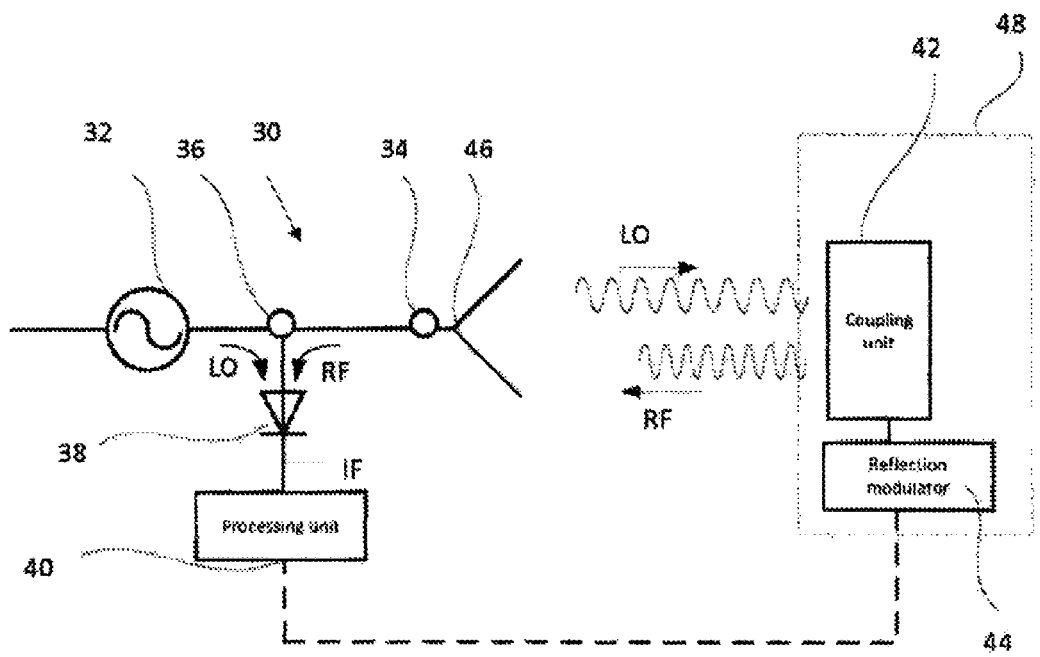
Figure 3:
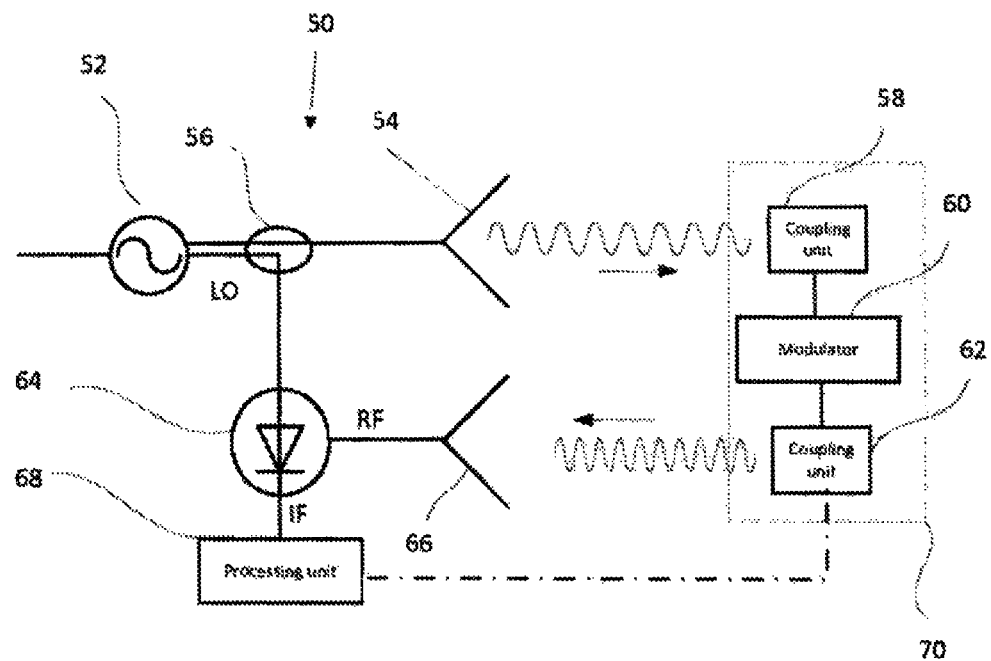
Figure 4:
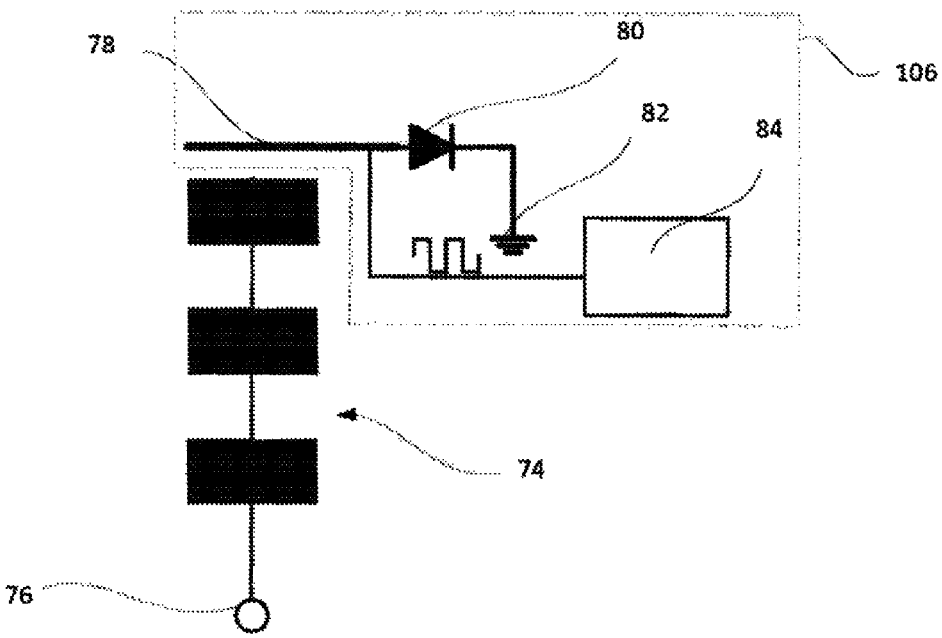
Figure 5:
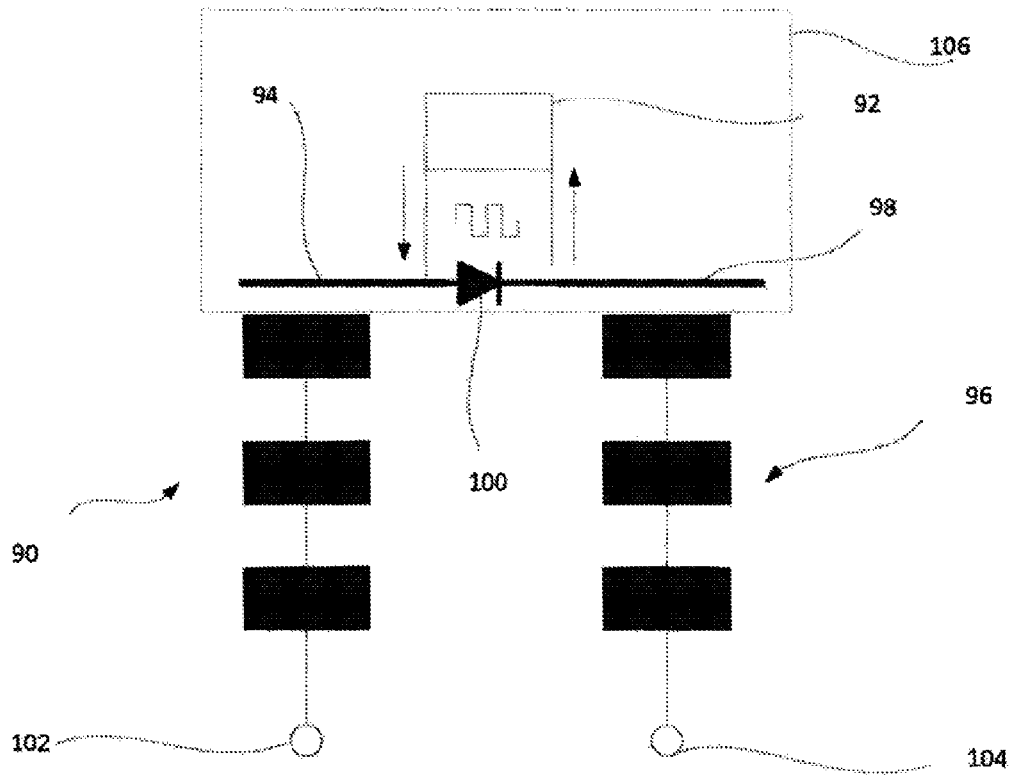

Throughout the description, the claims and the drawings, those terms and associated reference signs will be used as are notable from the enclosed list of reference signs. In the drawings is shown:

FIG. 1 the working principle of a state of the art Doppler transceiver;

FIG. 2 the principle of monitoring a single antenna transceiver;

FIG. 3 the principle of monitoring a dual antenna transceiver;

FIG. 4 an embodiment of the invention according to a single antenna transceiver equipped with a wireless coupling unit;

FIG. 5 an example according to a dual antenna transceiver, and

Figure 6:
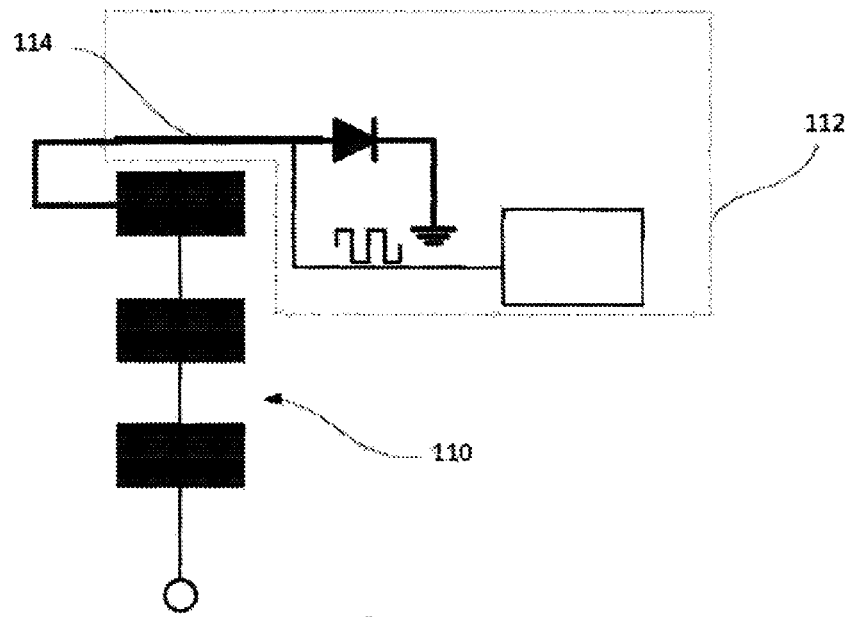

FIG. 6 an embodiment of the invention according to a single antenna transceiver equipped with a wired coupling unit.

FIG. 1 shows a Doppler transceiver 10 known in the state of the art. The Doppler transceiver 10 comprises a local oscillator 12 and a single antenna 14. The antenna 14 comprises a feed point 16, which is connected to the oscillator 12. Further, the Doppler transceiver 10 comprises a mixer unit 18. The mixer unit 18 is connected by a coupling structure 17 along the transmission line 22 connecting the oscillator 12 to the antenna feed point 16.

In order to detect a motion of an object 20 the local oscillator 12 generates a signal LO which is transmitted via the antenna 14 in a certain frequency $F_0$. The transmitted signal will be reflected by the object 20. The reflected signal RF is frequency shifted and modulated according to the movement of the object 20, especially depending on direction and velocity of the object 20. The reflected signal RF is received by the antenna 14 having a frequency which is reduced or increased by the Doppler frequency $F_D$. In the further process the transmitted signal LO with the frequency $F_0$ and the received signal RF having the frequency $F_0 \pm F_D$ are mixed in the mixer unit 18. After mixing the transmitted and the received signals, an IF signal having the difference frequency $F_D$ is gained at the intermediate frequency output of the mixer IF.

According to the state of the art for monitoring the integrity of the transceiver the output signal is modulated by influencing the oscillator 12. With this method of monitoring a Doppler transceiver 10 a disconnection of the antenna beyond the coupling point 17, for example at position 16, is not detectable. A processing unit connected to the intermediate frequency output of the mixer unit would not detect any frequency difference, as if there is no "no movement" in the detecting range when if the antenna is disconnected. Nevertheless, as the mixer 18 is still connected to the oscillator 12, the modulation applied to the oscillator would still be detected. Therefore, a disconnection error would not lead to an error handling procedure.

FIG. 2 depicts a schematic view of the principle for monitoring the integrity of a Doppler transceiver 30 comprising an oscillator 32 and a single antenna 46 connected via feed point 34 as well as a mixer structure 38 and a processing unit 40. According to the invention the transceiver 30 also comprises a coupling unit 42 and a reflection modulator 44, where the coupling unit 42 is connected to the reflection modulator 44. Furthermore, the reflection modulator 44 can be linked to the processing unit 40.

For checking the integrity of the transceiver 30 the usual microwave signal LO is generated by the oscillator 32 and transmitted via the antenna 46. This signal is coupled by the coupling unit 42 and led to the reflection modulator 44. The reflection modulator modulates the signal according to the parameters and reflects the modulated signal RF back to the antenna 46 of the transceiver 30. The outgoing signal LO having the oscillator frequency $F_0$ as well as the modulated signal RF are fed through the mixer unit 38 through the coupling structure 36. After mixing both signals LO and RF, a resulting IF signal is obtained and led from the intermediate frequency output of the mixer unit 38 to the processing unit 40. If the processing unit 40 detects an IF signal which fits the expected value, it is assumed that the Doppler transceiver 30 works properly. In the same case as described in the state of the art in FIG. 1, with disconnection on point 34 of the antenna, there will also be no frequency difference detected by the processing unit 40 under the motion of a target. But in difference to the state of the art, an antenna failure can be determined, due to the fact that the modulation parameters are applied by the reflection modulator 44, by the processing unit 40. In case of antenna failure, when the monitoring signal is applied, the obtained IF signal does not fit the expected IF signal.

FIG. 3 shows a further principle of the invention where the Doppler transceiver 50 comprises a dual antenna system 54, 66. Due to this embodiment the monitoring circuit works differently to the embodiment depicted in FIG. 2. In this case, as shown in FIG. 3, the Doppler transceiver 50 comprises an oscillator 52 which is connected to a transmitter antenna 54. The oscillator 52 generates a signal comprising a frequency of $F_0$ which is transmitted to the detection field. The oscillator 52 also feeds the mixer 64 with a local oscillator signal trough a coupling structure 56. The transmitted signal is partially coupled via a coupling unit 58, which is linked to a modulation unit 60. The coupled signal is modulated according to defined modulation parameters. In the further process the modulated signal is fed to a coupling unit 62. The modulated signal is coupled by the coupling unit 62 and transmitted back to the receiver antenna 66. As known from the above-mentioned examples, the modulated signal is fed to a mixer 64 which generates the difference frequency as it is known from the description of FIG. 2. The obtained signal is then fed to the processing unit 68. The processing unit 68 knows the modulation parameters applied by the modulation unit 60, and is able to compare the signal parameters to the modulation parameters and, at last, to determine whether there is a transceiver failure or not.

FIG. 4 shows a first embodiment of a single antenna transceiver and its monitoring circuit. For the sake of clarity, only the antenna as well as the monitoring circuit are shown in this FIG. 4.

According to this example the monitored transceiver comprises an antenna 74 with a feed point 76 where the transceiver electronics shall be connected. The antenna 74 is embodied as a micro strip patch antenna array. In vicinity of the antenna, a wirelesscoupling structure is applied on the same surface as the antenna. In case of the single antenna device the coupling structure 78 is built as a coupling line connected to a single microwave PIN diode 80. The PIN diode 80 is stimulated by the modulator 84. The PIN diode 80 is embodied as switching diode, which changes its reflection coefficient according to the modulation signal applied by the modulator 84. The coupled signal is reflected in a modulated way by the diode and coupled back to the antenna 74. Once the signal is received by the antenna 74 it is processed as described in FIG. 2.

Due to these micro strips structures the processing costs are very low. The antenna consists of three connected patches, which are applied to the surface. The length of the coupling line is tied to the emitted wavelength. Therefore, it might be necessary to adjust the position of the diode on the coupling line to achieve a proper transmission between antenna and coupling line.

The location of the coupling line in vicinity to the antenna 74 guarantees a proper operation of the microwave checks, triggered by the processing unit.

FIG. 5 shows a dual antenna transceiver, comprising two micro strip patch antenna arrays 90, 96. There is a first antenna array 90 for transmitting the signal and a second antenna array 96 for receiving the signal that is reflected by an object which is moving within the detection field of the transceiver.

Further, the device comprises a coupling line 94 that is arranged in vicinity to the transmitting antenna 90. The dimension of the coupling line 94 is tied to the transmitted wavelength of the transceiver and allows wireless coupling the transmitted signal. The signal is then fed to a modulation unit comprising a PIN diode 100, which is embodied as transmission type modulator. The modulation unit further comprises a modulator 92 that applies a stimulation signal to the PIN diode 100. Tied to the stimulation signal the coupled signal is modulated accordingly and passes the PIN diode 100 in a modulated way. Once the modulated signal, which can be modulated in amplitude and phase, passes the modulation unit it then reaches a further wireless coupling structure embodied as coupling line 98, where the signal is coupled back to the receiving antenna 96.

Once the signal is received, the signal will be processed as explained in FIG. 3. In this case the modulator is embodied as transmission type modulation unit which uses a change in transmission, an attenuation or a phase of the diode which is switched by a modulation signal. A transmission type transistor is also possible for modulating the signal like the above mentioned diode.

FIG. 6 shows an alternative embodiment of a single antenna transceiver and its monitoring circuit in comparison to the one depicted on FIG. 4. According to this example the coupling structure 114 consists of a wired electrical connection directly connected to the antenna 110. The modulation unit 112 is therefore coupled to the antenna in a wired way. The working principle described in FIG. 2 for a wireless embodiment is also fully valid for a wired embodiment of the invention. In difference to the wireless coupling, the wired coupling induces low and RF frequencies.

Due to the invention a periodical or permanent check of a Doppler transceiver can be done to verify the detection performance and to guarantee that the performance is maintained. The integrity of the complete sensor can be monitored continuously, in a very cheap way to ensure proper operation.

LIST OF REFERENCE SIGNS

10 Doppler transceiver
12 oscillator
14 antenna
16 antenna feed point
17 mixer coupling structure
18 mixer unit
20 object
22 transmission line
30 Doppler transceiver
32 Doppler transceiver
30 oscillator
34 antenna feed point
36 mixer coupling point
38 mixer structure
40 processing unit
42 coupling unit
44 reflection modulator
46 antenna
48 modulation unit
50 Doppler transceiver
52 oscillator 54 transmit antenna
56 mixer local oscillator coupling point
58 coupling unit
60 modulation unit
62 coupling unit
64 mixer unit
66 receiving antenna
68 processing unit
70 modulation unit
74 microstrip patch array
76 feed point
78 coupling line
80 microwave PIN diode
82 ground
84 modulator
86 modulation unit
90 microstrip patch array transmitter antenna
94 coupling line
96 receiver antenna
98 coupling line
100 microwave PIN diode
102 transmitter feed point
104 receiver feed point
106 coupling line—modulation unit
110 patch antenna array
112 modulation unit
114 wired coupling line

The invention claimed is:

1. Method for monitoring the integrity of a Doppler transceiver, said Doppler transceiver includes a transmitter unit which includes a transmitting antenna, a receiver unit which includes a receiving antenna, at least one mixer unit, a processor unit, and, a signal transmitted from said transmitting antenna of said transmitter unit, comprising the steps of:
  transmitting, using said transmitting antenna, partially, said transmitted signal into a modulation unit using a transmitted signal path, said modulation unit integrated between said transmitting antenna and said receiving antenna;
  said processing unit triggering said modulated signal utilizing a separate path other than said signal path between said transmitting antenna and said modulation unit;
  modulating said transmitted signal according to certain parameters;
  transmitting using said modulation unit said modulated signal back to said receiving antenna of said receiver unit;
  mixing said received signal and said transmitted signal in said mixer unit to detect signal modulation; and,
  processing said modulated signal in said processing unit and classifying said modulated signal as a correct response of said transceiver under applied calibrated stimulation.

2. Method according to claim 1, further comprising the steps of:
  reflecting, using said modulation unit, said modulated signal back to at least a single transmit/receive antenna.

3. Method according to claim 1, further comprising the steps of:
  coupling, using a coupling unit, said transmitted signal into said modulation unit.

4. Method according to claim 1, further comprising the steps of:
  coupling, using a coupling unit, said modulated signal into said receiver unit.

5. Method according to claim 1, further comprising the steps of:
  mixing said received modulated signal with said transmitted signal and obtaining a demodulated IF signal.

6. Method according to claim 5, further comprising the steps of:
  comparing, using a processing unit, said IF signal to expected values.

7. Method according to claim 1, wherein said modulation shifts phase and/or amplitude and/or frequency of said transmitted signal.

8. Method according to claim 1, wherein said certain parameters relate to amplitude, frequency, and/or phase.

9. Doppler transceiver, comprising:
  a transmitter unit and a receiver unit which utilize a signal path, said transmitter unit includes at least one antenna, and, said receiver unit includes at least one antenna;
  a mixer unit;
  a modulation unit integrated between said at least one antenna of said transmitter unit and said at least one antenna of said receiver unit, said modulation unit is coupled to at least one antenna of said transmitter unit and said at least one antenna of said receiver unit;
  a processing unit triggering and controlling said modulation unit by a link independent of said signal path.

10. Doppler transceiver according to claim 9, wherein said modulation unit is wirelessly coupled to said antenna.

11. Doppler transceiver according to claim 9, wherein said transmitter unit and said receiver unit use a single antenna.

12. Doppler transceiver according to claim 9, wherein said at least one transmitter antenna and said at least one receiver antenna operate at RF-frequencies.

13. Doppler transceiver according to claim 9, wherein said transceiver is a microwave sensor and/or a radar sensor.

14. Doppler transceiver according to claim 9, wherein said modulation unit is arranged in the vicinity of said antenna.

15. Doppler transceiver according to claim 9, wherein said modulation unit and said antenna reside on the same substrate.

16. Doppler transceiver according to claim 9 wherein said modulation unit modulates said transmitted signal according to certain parameters.

17. Doppler transceiver according to claim 16 wherein said certain parameters relate to amplitude, frequency, and/or phase.

18. Method for monitoring the integrity of a Doppler transceiver, said Doppler transceiver includes a transmitter unit, a receiver unit, at least one mixer unit, a processing unit, and, a signal transmitted from said transmitter unit, comprising the steps of:
  transmitting, partially, said transmitted signal to a modulation unit;
  triggering, using said processing unit, said modulation unit and modulating said transmitted signal according to defined parameters;
  transmitting said modulated signal back to said receiver unit;
  mixing said received signal and said transmitted signal in said mixer unit to obtain an IF signal; and,
  processing said IF signal in said processing unit and comparing said IF signal to an expected value to determine when said transceiver system is functioning correctly.

19. Method according to claim 18 wherein:
  said defined parameters relate to amplitude, frequency and/or phase; and,
  said modulation unit is triggered periodically or permanently.

* * * * *

UNITED STATES PATENT AND TRADEMARK OFFICE
CERTIFICATE OF CORRECTION

PATENT NO. : 8,886,134 B2  
APPLICATION NO. : 13/191382  
DATED : November 11, 2014  
INVENTOR(S) : Borlez et al.

Page 1 of 1

It is certified that error appears in the above-identified patent and that said Letters Patent is hereby corrected as shown below:

On the Title page

On first page, column 2, under Other Publications, line 2, delete "10170828.7-2200," and insert -- 10170828.7-2220, --, therefor.

On first page, column 2, under Other Publications, line 8, delete "101708287-1812," and insert -- 10170828.7-1812, --, therefor.

In the Specification

In column 1, lines 5-6, after "number:" delete "10 170 828.7 filed on Jul. 26, 2010. European patent application number".

In column 1, line 48, delete "B1)" and insert -- B1). --, therefor.

In column 2, line 51, delete "sensors" and insert -- sensor's --, therefor.

Signed and Sealed this
Thirtieth Day of June, 2015

Michelle K. Lee
*Director of the United States Patent and Trademark Office*